United States Patent
Tochigi et al.

(10) Patent No.: US 11,008,007 B2
(45) Date of Patent: May 18, 2021

(54) VEHICLE CONTROL APPARATUS

(71) Applicant: TOYOTA JIDOSHA KABUSHIKI KAISHA, Toyota (JP)

(72) Inventors: Kohei Tochigi, Susono (JP); Shin Tanaka, Numazu (JP); Masahiko Adachi, Susono (JP); Shogo Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/365,087

(22) Filed: Mar. 26, 2019

(65) Prior Publication Data
US 2019/0299990 A1 Oct. 3, 2019

(30) Foreign Application Priority Data
Mar. 27, 2018 (JP) .............................. JP2018-060103

(51) Int. Cl.
*B60W 30/16* (2020.01)
*B60W 50/00* (2006.01)

(52) U.S. Cl.
CPC ...... *B60W 30/162* (2013.01); *B60W 50/0098* (2013.01)

(58) Field of Classification Search
CPC ...................... B60W 30/162; B60W 50/0098
See application file for complete search history.

(56) References Cited

U.S. PATENT DOCUMENTS

| 8,788,176 | B1* | 7/2014 | Yopp ................... B60W 30/162 701/96 |
| 9,990,332 | B2* | 6/2018 | Takahashi ............... B60T 7/042 |
| 2006/0190158 | A1* | 8/2006 | Shiiba ............... B60K 31/0066 701/70 |
| 2009/0198426 | A1* | 8/2009 | Yasui .................. B60W 10/184 701/70 |
| 2013/0030688 | A1* | 1/2013 | Shimizu ........... G08G 1/096791 701/301 |
| 2015/0153737 | A1 | 6/2015 | Shiota et al. |
| 2015/0274162 | A1 | 10/2015 | Sato |
| 2019/0317499 | A1* | 10/2019 | Imai .................... B60W 30/146 |

FOREIGN PATENT DOCUMENTS

| JP | 2013-256225 A | 12/2013 |
| WO | 2014/076759 A1 | 5/2014 |

* cited by examiner

*Primary Examiner* — Tyler J Lee
*Assistant Examiner* — Yufeng Zhang
(74) *Attorney, Agent, or Firm* — Sughrue Mion, PLLC

(57) ABSTRACT

A vehicle control apparatus is provided with: an acquirer configured to obtain an expected end timing of a first deceleration support control, which is a deceleration support control for a first target, and an expected start timing of a second deceleration support control, which is the deceleration support control for a second target, if there is the first target as a deceleration target ahead of a host vehicle in the traveling direction and if there is the second target as the deceleration target ahead of the first target; and a controller programmed or configured to perform an interpolation deceleration support control of interpolating the first deceleration support control and the second deceleration support control, in a predetermined period including at least a part of an interval between the expected end timing and the predicted start timing, if the interval is less than a first time.

5 Claims, 9 Drawing Sheets

VEHICLE CONTROL APPARATUS

CROSS-REFERENCE TO RELATED APPLICATIONS

This application is based upon and claims the benefit of priority of the prior Japanese Patent Application No. 2018-060103, filed on Mar. 27, 2018, the entire contents of which are incorporated herein by reference.

BACKGROUND

1. Technical Field

Embodiments of the present disclosure relate to a vehicle control apparatus, and particularly to a vehicle control apparatus configured to perform a deceleration support control.

2. Description of the Related Art

For this type of apparatus, for example, there is proposed an apparatus configured to perform a deceleration control in such a manner that a relative deceleration of a host vehicle based on a target that is ahead in a traveling direction of the host vehicle is a target relative deceleration, thereby setting a relative speed of the host vehicle based on the target to be less than or equal to a defined speed at a target position set behind the target (refer to Japanese Patent Application Laid Open No. 2013-256225 (Patent Literature 1)). In addition, a related technology/technique is described in International Publication WO2014/076759 (Patent Literature 2).

If there are a plurality of targets of the deceleration control, the deceleration control is performed on each of the plurality of targets. If a deceleration control for one target and a deceleration control for another target are performed in a relatively short period (e.g., in a period short enough for a driver to feel as if the deceleration control for one target and the deceleration control for another target were a series of deceleration control) and if a period between the end of the deceleration control for one target and the start of the deceleration control for another target is a period that the driver can perceive, the driver possibly feels as if the deceleration control were interrupted. This point is not considered in the technology/technique described in the Patent Literature 1.

SUMMARY

In view of the aforementioned problems it is therefore an object of embodiments of the present disclosure to provide a vehicle control apparatus configured to prevent the driver from feeling uncomfortable if the deceleration control is continuously performed on two targets.

The above object of embodiments of the present disclosure can be achieved by a vehicle control apparatus configured to perform a deceleration support control of automatically decelerating a host vehicle on condition that there is a deceleration target, which requires decelerating the host vehicle, ahead in a traveling direction of the host vehicle, the vehicle control apparatus provided with: an acquirer configured to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a controller programmed or configured to perform an interpolation deceleration support control of interpolating the first deceleration support control and the second deceleration support control, in a predetermined period including at least a part of an interval between the expected end timing and the predicted start timing, if the interval is less than a first time.

The above object of embodiments of the present disclosure can be also achieved by a vehicle control apparatus configured to perform a deceleration support control of automatically decelerating a host vehicle on condition that there is a deceleration target, requires decelerating the host vehicle, ahead in a traveling direction of the host vehicle, the vehicle control apparatus provided with: an acquirer configured to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a controller programmed or configured to perform at least one of continuing the first deceleration support control beyond the expected end timing and starting the second deceleration support control before the expected start timing, if an interval between the expected end timing and the expected start timing is less than a second time.

DETAILED DESCRIPTION OF THE EMBODIMENTS

Embodiments of a vehicle control apparatus according to the present disclosure will be explained with reference to the drawings.

First Embodiment

A vehicle control apparatus according to a first embodiment of the present disclosure will be explained with reference to FIG. 1 to FIG. 4C.

(Configuration)

Figure 1:
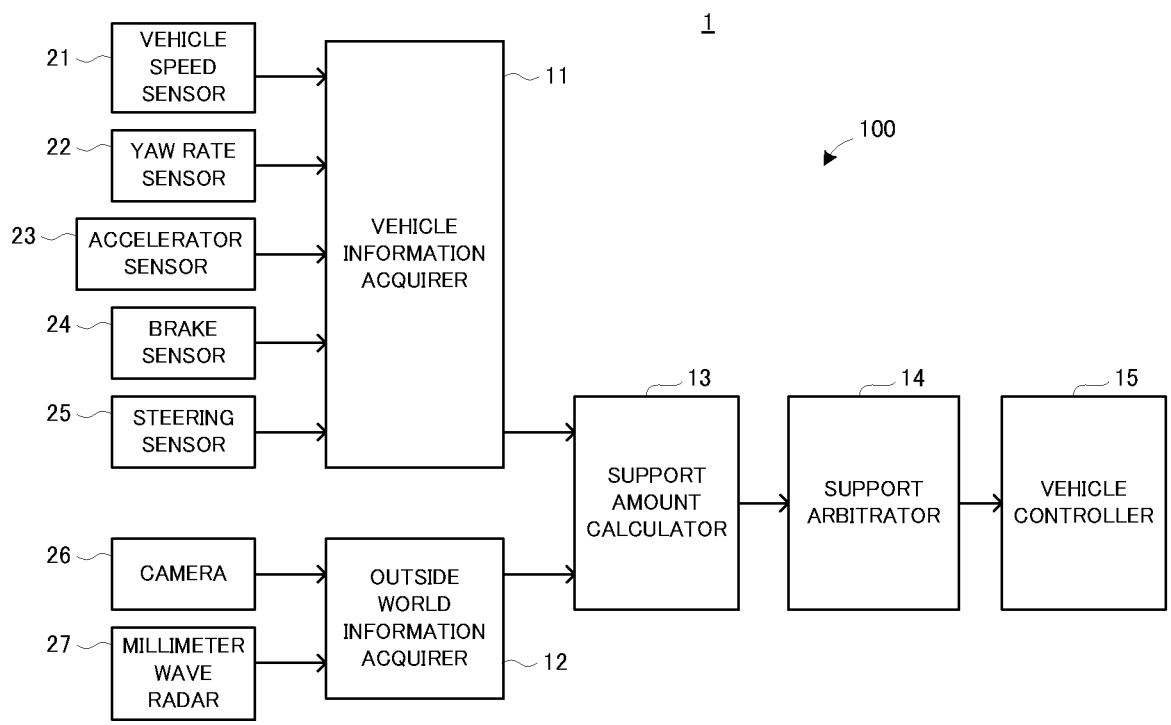
FIG. 1 is a block diagram illustrating a configuration of a vehicle control apparatus according to a first embodiment.

A configuration of the vehicle control apparatus according to the first embodiment will be explained with reference to FIG. 1. FIG. 1 is a block diagram illustrating the configuration of the vehicle control apparatus according to the first embodiment.

In FIG. 1, a vehicle control apparatus 100 is mounted on a vehicle 1. The vehicle control apparatus 100 is configured to perform a deceleration support control of automatically decelerating the vehicle 1 particularly if there is a target that requires the deceleration of the vehicle 1 (hereinafter referred to as a "deceleration target" as occasion demands) ahead in a traveling direction of the vehicle 1, such as, for example, a traffic light with a red light color and a preceding vehicle that is slower than the vehicle 1. The vehicle control apparatus 100 is provided with a vehicle information acquirer 11, an outside world information acquirer 12, a support amount calculator 13, a support arbitrator 14, and a vehicle controller 15.

The vehicle information acquirer 11 is configured to obtain vehicle information indicating a state of the vehicle 1, for example, from respective outputs of a vehicle speed sensor 21, a yaw rate sensor 22, an accelerator sensor 23, a brake sensor 24, and a steering sensor 25.

The outside world information acquirer 12 is configured to obtain outside world information indicating a situation around the vehicle 1, for example, from an image taken by a camera 26 and a detection result of a millimeter wave radar 27. The outside world information includes, for example, the position and speed of another vehicle and a pedestrian that are around the vehicle 1, the position and state information (e.g., information indicating a light color) of a traffic light, the position and type of a sign and a road marking, travel route information (e.g., a shape, etc.).

The support amount calculator 13 is configured to detect the deceleration target from the outside world information. The support amount calculator 13 is configured to calculate a target deceleration for decelerating the vehicle 1, on the basis of the vehicle information and the outside world information, for example, in such a manner that a speed of the vehicle 1 at a target position set in accordance with the deceleration target approaches a target speed, if the deceleration target is detected. If a plurality of deceleration targets are detected, the support amount calculator 13 is particularly configured to calculate a plurality of target decelerations respectively corresponding to the plurality of deceleration targets.

Here, regarding the "target position set in accordance with the deceleration target", for example, if the deceleration target is a traffic light, a position of a stop line corresponding to the traffic light may be set as the target position. If the deceleration target is a preceding vehicle, a position that is a predetermined distance away from a rear end of the preceding vehicle may be set as the target position. A method of calculating the target deceleration, i.e., a support amount, is not limited to the aforementioned method, and various existing aspects can be applied.

If a plurality of target decelerations respectively corresponding to a plurality of deceleration targets are calculated by the support amount calculator 13 due to the detection of the plurality of deceleration targets, the support arbitrator 14 is configured to arbitrate the plurality of target decelerations (which will be described in detail later). The support arbitrator 14 is configured to output an arbitrated target deceleration to the vehicle controller 15. If there is only one target deceleration calculated by the support amount calculator 13, the support arbitrator 14 is configured to output the target deceleration to the vehicle controller 15 without a change.

The vehicle controller 15 is programmed or configured to control not-illustrated various actuators on the basis of the target deceleration outputted from the support arbitrator 14.

(Deceleration Support Process)

Figure 2:
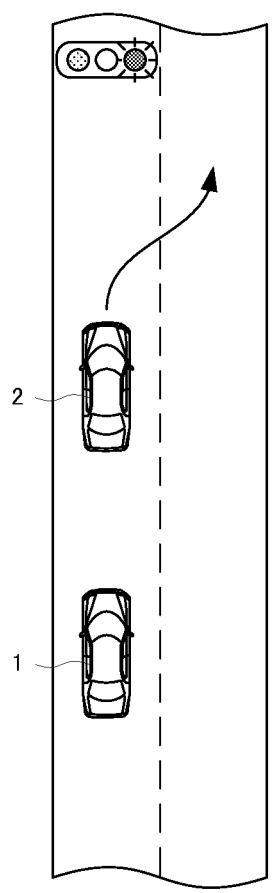
FIG. 2 is a block diagram illustrating an example of a situation in which a deceleration support control according to the first embodiment is performed.

FIG. 2 illustrates an example of a situation in which the plurality of deceleration targets are detected during the running of the vehicle 1 on which the vehicle control apparatus 100 as configured above is mounted. In FIG. 2, there is a preceding vehicle 2 ahead in the traveling direction of the vehicle 1, and a traffic light placed ahead in a traveling direction of the preceding vehicle 2 is red. In this case, the preceding vehicle 2 and the traffic light are detected as the deceleration target. As illustrated in FIG. 2, the preceding vehicle 2 is closer to the vehicle 1 than the traffic light is. Therefore, firstly, the deceleration support control is performed on the preceding vehicle 2 by the vehicle control apparatus 100. Then, if the preceding vehicle 2 is excluded from the deceleration target due to a lane change by the preceding vehicle 2, the deceleration support control is performed on the traffic light by the vehicle control apparatus 100; namely, the target of the deceleration support control is changed from the preceding vehicle 2 to the traffic light.

If the vehicle 2 stops at the red traffic light without a lane change, the deceleration support control for the preceding vehicle 2 is continued, and the deceleration support control for the traffic light is substantially not performed. For example, even if the target deceleration is calculated for the traffic light by the support amount calculator 13, the calculated target deceleration is not reflected in the control of the various actuators by the vehicle controller 15.

Figure 3:
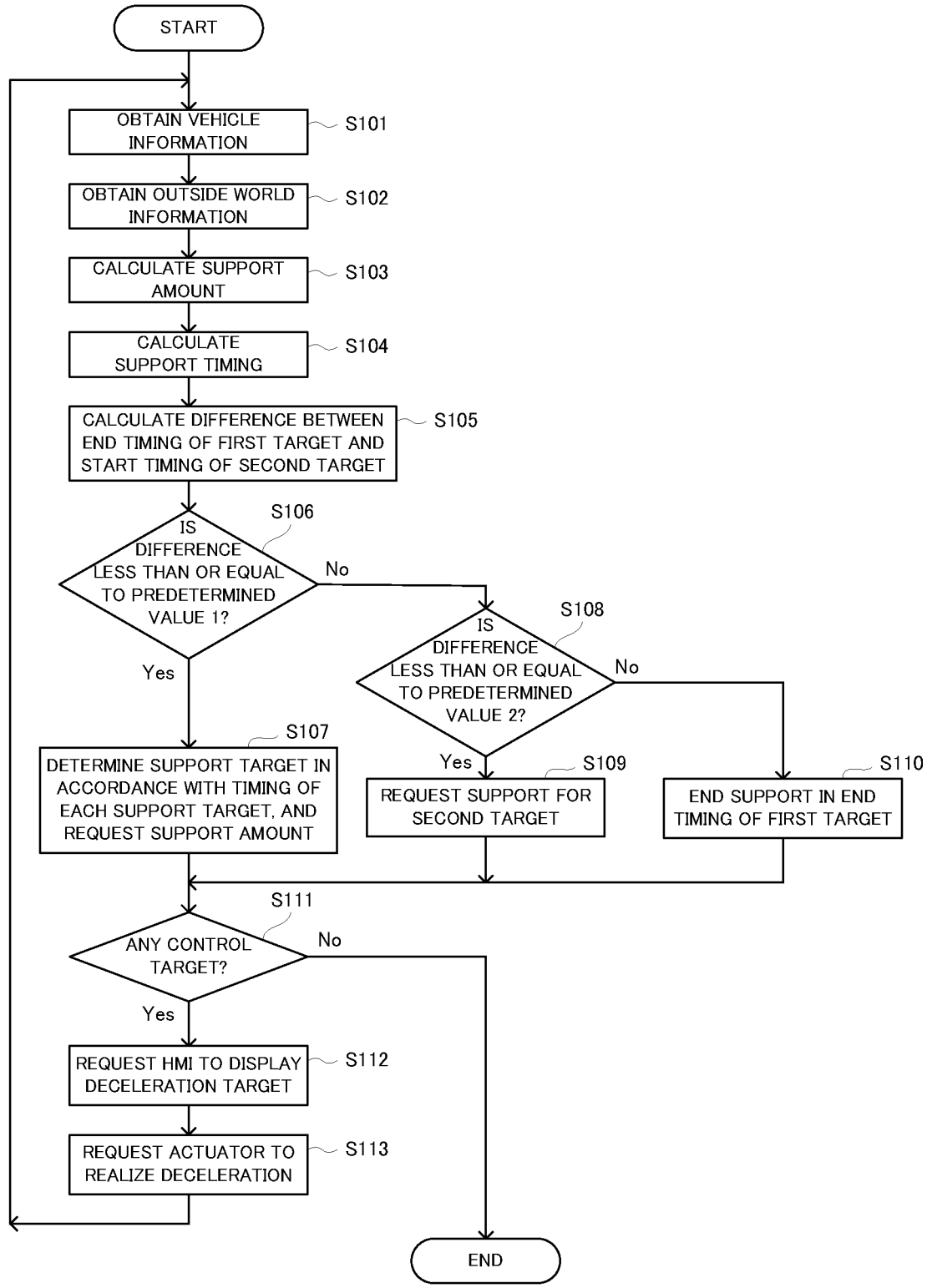
FIG. 3 is a flowchart illustrating a deceleration support process according to the first embodiment.

With reference to a flowchart in FIG. 3, an explanation will be given to a deceleration support process performed by the vehicle control apparatus 100 if the plurality of deceleration targets are detected. In FIG. 3, a "first target" and a "second target" are the deceleration targets that are ahead in the traveling direction of the vehicle 1. As viewed from the vehicle 1, the "first target" shall be closer to the vehicle 1 than the "second target" is.

In FIG. 3, the vehicle information acquirer 11 obtains the vehicle information (step S101). In parallel with the step S101, the outside word information acquirer 12 obtains the outside world information (step S102). The support amount calculator 13 detects the deceleration target from the outside world information. Here, the first target and the second target shall be detected as the deceleration target.

The support amount calculator 13 calculates the target decelerations respectively corresponding to the first target and the second target (step S103). In parallel with the step S103, the support arbitrator 14 calculates a support start timing and a support end timing of a deceleration support control for the first target (hereinafter referred to a "first deceleration support control" as occasion demands) and a support start timing and a support end timing of a deceleration support control for the second target (hereinafter referred to a "second deceleration support control" as occasion demands) (step S104).

Here, the support start timing may be, for example, a timing in which a driver of the vehicle 1 is expected to start a deceleration operation, which is obtained from a relative speed and a relative distance between the vehicle 1 and the deceleration target based on the outside world information. The support end timing may be, for example, a timing in which the speed of the vehicle 1 reaches the target speed, which is obtained from the relative speed and the relative distance between the vehicle 1 and the deceleration target based on the outside world information, the support start timing, and the deceleration. In the first embodiment, a support flag is set on the basis of the support start timing and the support end timing calculated in the step S104 (refer to FIG. 4A to FIG. 4C). A method of calculating the support start timing and the support end timing is not limited to the aforementioned method, and various existing aspects can be applied.

The support arbitrator 14 then calculates a difference, i.e., an interval, between the support end timing of the first deceleration support control and the support start timing of the second deceleration support control (step S105). The support arbitrator 14 then determines whether or not the difference is less than or equal to a predetermined value 1 (step S106). Here, the "predetermined value 1" may be set as a time that is too short for the driver of the vehicle 1 to perceive a phenomenon in which the deceleration temporarily disappears, i.e., a poor brake feel, in a period (or the interval) between the end of the first deceleration support control and the start of the second deceleration support control.

In the step S106, if it is determined that the difference is less than or equal to the predetermined value 1 (the step S106: Yes), the support arbitrator 14 determines a support target of the deceleration support control (which is herein the first target or the second target) on the basis of the support flag of each of the first target and the second target, and requests the target deceleration, i.e., the support amount, for the determined support target from the support amount calculator 13 (step S107).

Figure 4A:
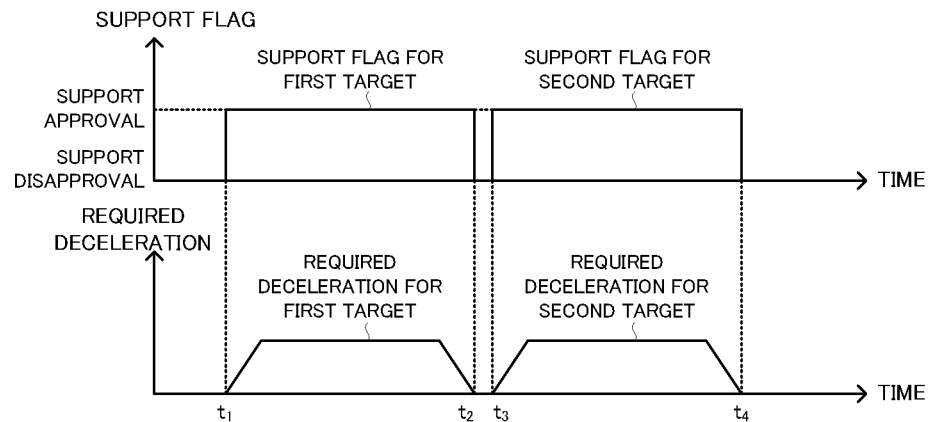
FIG. 4A is a timing chart illustrating an example of the deceleration support control according to the first embodiment.

The step S107 will be explained with reference to FIG. 4A. In FIG. 4A, a time point $t_1$, a time point $t_2$, a time point $t_3$, and a time point $t_4$ are respectively the "support start timing of the first deceleration support control", the "support end timing of the first deceleration support control", the "support start timing of the second deceleration support control", and the "support end timing of the second deceleration support control", which are calculated in the step S104. The difference corresponds to a difference between the time point $t_2$ and the time point $t_3$. A "required deceleration" in FIG. 4A corresponds to the "target deceleration (for the support target)", and the same shall apply to FIG. 4B, FIG. 4C, FIG. 5, FIG. 7 and FIG. 9.

In a period between the time point $t_1$ and the time point $t_2$, i.e., in a period in which the support flag for the first target indicates support approval, the support target of the deceleration support control is determined to be the first target. Therefore, in the period between the time point $t_1$ and the time point $t_2$, the support arbitrator 14 may request the target deceleration for the first target from the support amount calculator 13. In the same manner, in a period between the time point $t_3$ and the time point $t_4$, i.e., in a period in which the support flag for the second target indicates support approval, the support target of the deceleration support control is determined to be the second target. Therefore, in the period between the time point $t_3$ and the time point $t_4$, the support arbitrator 14 may request the target deceleration for the second target from the support amount calculator 13. In this case, the first deceleration support control and the second deceleration support control are performed independently of each other.

Back in FIG. 3, after the step S107, the vehicle control apparatus 100 determines whether or not there is any control target (step S111). The expression "there is no control target" may mean that the deceleration target no longer exists (e.g., a situation in which there is no other vehicle ahead in the traveling direction of the vehicle 1 due to a route change or the like, or a situation in which the traffic light no longer corresponds to the deceleration target because the light color of the traffic light is changed from red to green, etc.), or that the deceleration support control is unnecessary, for example, because the speed of the vehicle 1 reaches the target speed.

In the step S111, if it is determined that there is no control target (the step S111: No), the process illustrated in FIG. 3 is ended. On the other hand, in the step S111, if it is determined that there is a control target (the step S111: Yes), the vehicle controller 15 requests a not-illustrated human machine interface (HMI) to display the present support target of the deceleration support control determined on the basis of the support flag (which is herein the first target or the second target) (step S112).

In parallel with the step S112, the vehicle controller 15 controls the various actuators to realize the target deceleration outputted from the support arbitrator 14; namely, the vehicle controller 15 requests the various actuators to realize the target deceleration (step S113). Then, the step S101 is performed again.

In the step S106, if it is determined that the difference is greater than the predetermined value 1 (the step S106: No), the support arbitrator 14 determines whether or not the difference is less than or equal to a predetermined value 2, wherein the predetermined value 2 is greater than the predetermined value 1 (step S108). Here, the "predetermined value 2" may be set as a time long enough for the driver of the vehicle 1 to perceive the poor brake feel, and as a time that allows the driver of the vehicle 1 to feel as if the first deceleration support control and the second deceleration support control were a series of deceleration support control.

In the step S108, if it is determined that the difference is less than or equal to the predetermined value 2 (the step S108: Yes), the support arbitrator 14 requests the target deceleration for the second target from the support amount calculator 13 (step S109).

Figure 4B:
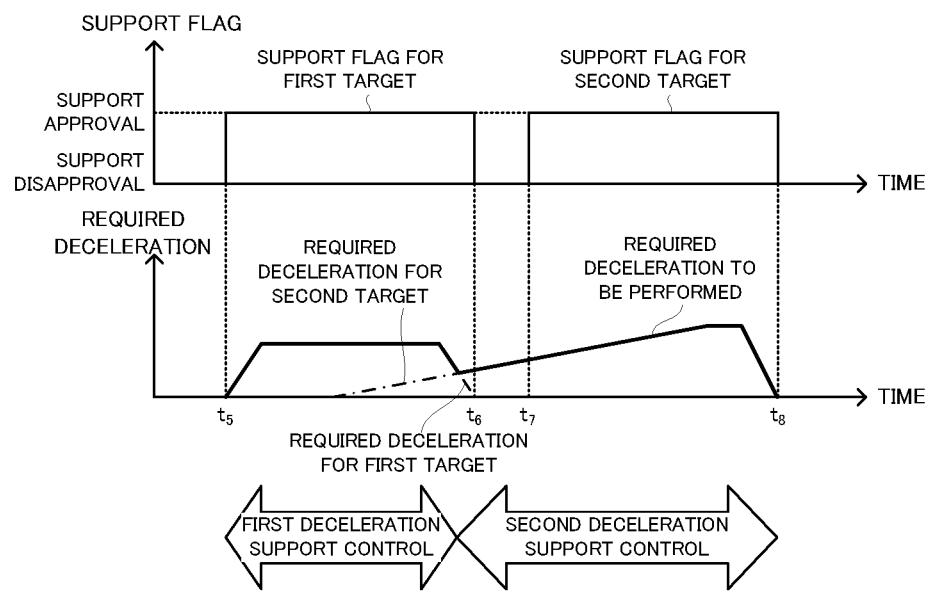
FIG. 4B is a timing chart illustrating an example of the deceleration support control according to the first embodiment.

The step S109 will be explained with reference to FIG. 4B. In FIG. 4B, a time point $t_5$, a time point $t_6$, a time point $t_7$, and a time point $t_8$ are respectively the "support start timing of the first deceleration support control", the "support end timing of the first deceleration support control", the "support start timing of the second deceleration support control", and the "support end timing of the second deceleration support control", which are calculated in the step S104. The difference corresponds to a difference between the time point $t_6$ and the time point $t_7$.

The step S108 may be performed when the first deceleration support control is performed, i.e., when the support amount calculator 13 calculates the target deceleration for the first target. Thus, in the step S109, the support amount calculator 13 may calculate the target deceleration for the second target (refer to the "required deceleration for the second target" indicated by an alternate long and short dash line in FIG. 4B), in addition to the target deceleration for the first target.

The support amount calculator 13 is requested to calculate the target deceleration for the second target earlier than at the time point $t_7$, which is the original support start timing, and thus, the calculated target deceleration for the second target rises relatively mildly, i.e., a changing gradient is relatively mild.

The support arbitrator 14 may change the support target from the first target to the second target, for example, in a timing in which the target deceleration for the second target becomes equal to the target deceleration for the first target. In other words, the support arbitrator 14 may output the target deceleration for the second target to the vehicle controller 15 instead of the target deceleration for the first target, for example, in the timing in which the target deceleration for the second target becomes equal to the target deceleration for the first target. As a result, the first deceleration support control and the second deceleration support control may be performed continuously, i.e., without an interval. In other words, the second deceleration support control may be started before the support start timing calculated in the step S104 (which is herein the time point $t_7$).

Back in FIG. 3 again, in the step S108, if it is determined that the difference is greater than the predetermined value 2 (the step S108: No), the support arbitrator 14 ends the first deceleration support control in the support end timing of the first deceleration support control (step S110). In other words, the support arbitrator 14 determines the support target of the deceleration support control on the basis of the support flag of each of the first target and the second target, and requests the target deceleration for the determined support target from the support amount calculator 13, as in the step S107 described above.

Figure 4C:
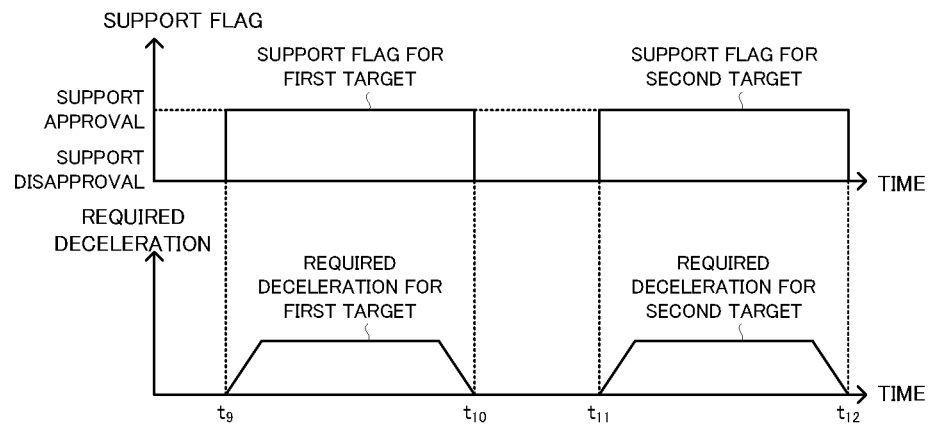
FIG. 4C is a timing chart illustrating an example of the deceleration support control according to the first embodiment.

The step S110 will be explained with reference to FIG. 4C. In FIG. 4C, a time point $t_9$, a time point $t_{10}$, a time point $t_{11}$, and a time point $t_{12}$ are respectively the "support start timing of the first deceleration support control", the "support end timing of the first deceleration support control", the "support start timing of the second deceleration support control", and the "support end timing of the second deceleration support control", which are calculated in the step S104. The difference corresponds to a difference between the time point $t_{10}$ and the time point $t_{11}$.

In a period between the time point $t_9$ and the time point $t_{10}$, i.e., in a period in which the support flag for the first target indicates support approval, the support target of the deceleration support control is determined to be the first target. Therefore, in the period between the time point $t_9$ and the time point $t_{10}$, the support arbitrator 14 may request the target deceleration for the first target (corresponding to the "required deceleration" in FIG. 4C) from the support amount calculator 13. In the same manner, in a period between the time point $t_{11}$ and the time point $t_{12}$, i.e., in a period in which the support flag for the second target indicates support approval, the support target of the deceleration support control is determined to be the second target. Therefore, in the period between the time point $t_{11}$ and the time point $t_{12}$, the support arbitrator 14 may request the target deceleration for the second target from the support amount calculator 13. In this case, the first deceleration support control and the second deceleration support control are performed independently of each other.

Technical Effect

If the interval between the support end timing of the first deceleration support control and the support start timing of the second deceleration support control is short enough for the driver of the vehicle 1 to feel as if both the first and second deceleration support controls were a series of deceleration support control and if the deceleration temporarily disappears due to the end of the first deceleration support control, the driver possibly feels as if the deceleration support control were interrupted.

On the vehicle control apparatus 100, however, if the interval between the support end timing of the first deceleration support control and the support start timing of the second deceleration support control is greater than the predetermined value 1 and is less than or equal to the predetermined value 2, then, the first deceleration support control and the second deceleration support control are performed continuously. It is thus possible to prevent the driver from feeling that the deceleration support control is interrupted. In other words, it is possible to prevent the driver from feeling uncomfortable.

Modified Example

Figure 5:
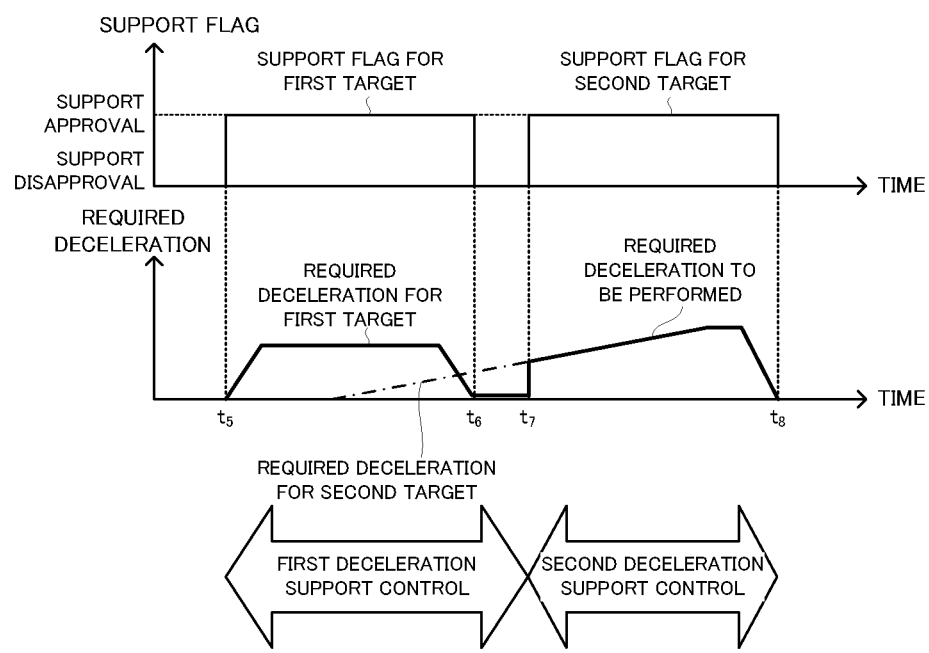
FIG. 5 is a timing chart illustrating an example of a deceleration support control according to a modified example of the first embodiment.

Instead of the step S109 described above, the first deceleration support control may be continued until the support start timing of the second deceleration support control. Specifically, as illustrated in FIG. 5, the first deceleration support control may be continued, for example, by setting the target deceleration for the first target may be set to be relatively small in a period between the time point $t_6$ and the time point $t_7$. In this case, at the time point $t_7$, the support target is changed from the first target to the second target. In other words, the support arbitrator 14 may output the target deceleration for the first target to the vehicle controller 15 from the time point $t_5$ to the time point $t_7$, and may output the target deceleration for the second target to the vehicle controller 15 instead of the target decelerate on for the first target, at the time point $t_7$. In other words, the first deceleration support control may be continued beyond the support end timing calculated in the step S104 (which is the time point $t_6$ in FIG. 5).

Other Modified Examples (1) Instead of the step S109 described above, the first deceleration support control may be continued beyond the support end timing, which is the time point $t_6$ in FIG. 5, and the second deceleration support control may be started before the support start timing, which is the time point $t_7$ in FIG. 5.

(2) Instead of the step S109 described above, at least one of the followings (a) and (b) may be performed; namely, (a) the first deceleration support control is continued beyond the support end timing calculated in the step S104, and (b) the second deceleration support control is started before the support start timing calculated in the step S104, in order that the interval between the support end timing of the first deceleration support control and the support start timing of the second deceleration support control is less than or equal to the predetermined value 1. In this case, the first deceleration support control and the second deceleration support control may not be performed continuously, i.e., without an interval. Specifically, for example, as illustrated in FIG. 4A, the first deceleration support control and the second deceleration support control may be performed independently of each other.

Second Embodiment

A vehicle control apparatus according to a second embodiment will be explained with reference to FIG. 6 and FIG. 7. The second embodiment is the same as the aforementioned first embodiment, except in a part of the deceleration support process. Thus, in the second embodiment, the same explanation as that in the first embodiment will be omitted, and the same parts on the drawing will carry the same reference numerals. Only a basically different point will be explained with reference to FIG. 6 and FIG. 7.

(Deceleration Support Process)

In the second embodiment, in the step S108, if it is determined that the difference, i.e., the interval, between the support end timing of the first deceleration support control and the support start timing of the second deceleration support control is less than or equal to the predetermined value 2 (the step S108: Yes), an interpolation deceleration support control is performed in a predetermined period including at least one of the interval between the support end timing of the first deceleration support control and the support start timing of the second deceleration support control.

Figure 6:
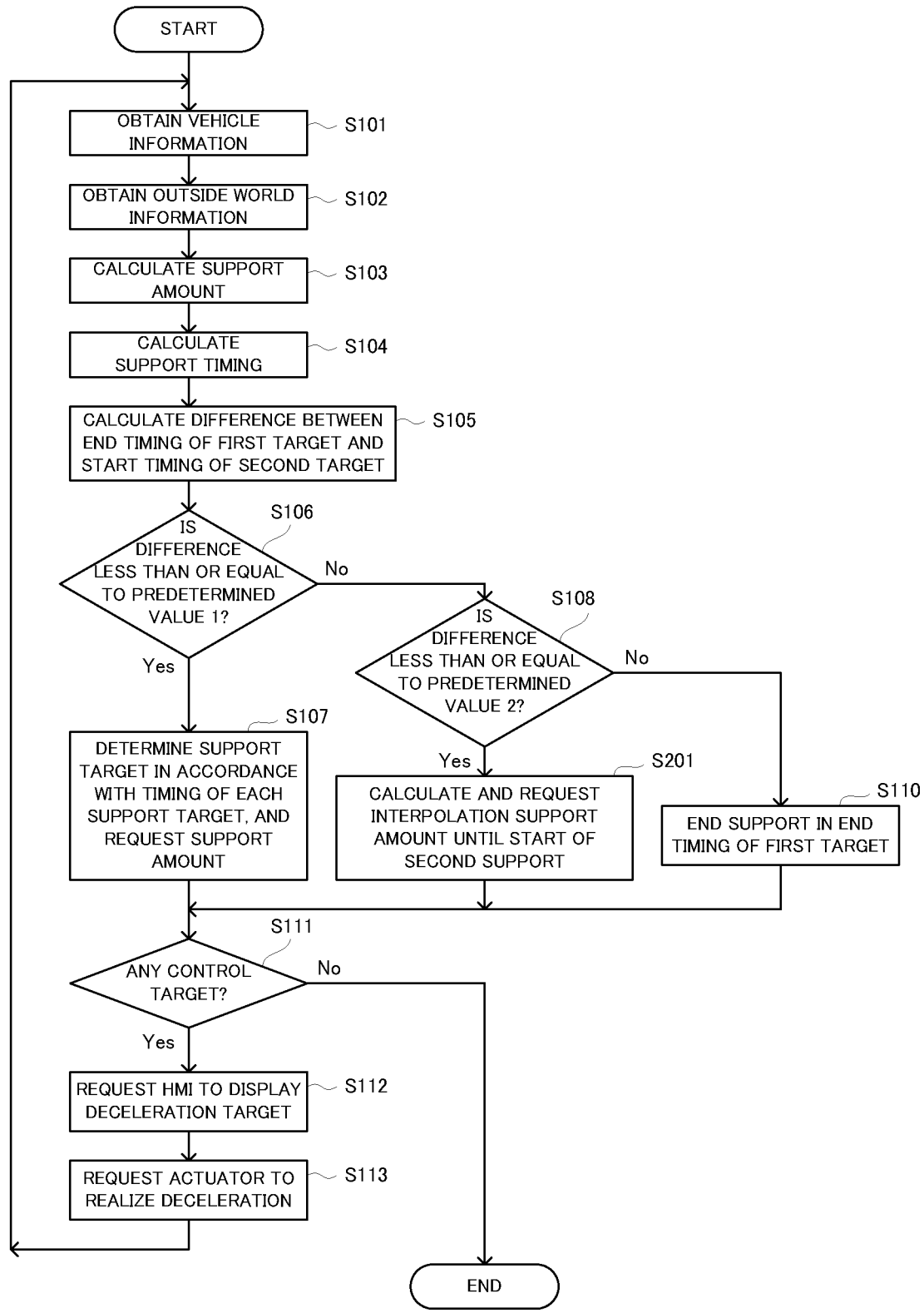
FIG. 6 is a flowchart illustrating a deceleration support process according to a second embodiment.

Specifically, in the step S108 in FIG. 6, if it is determined that the difference is less than or equal to the predetermined value 2 (the step S108: Yes), the support arbitrator 14 requests the support amount calculator 13 to calculate an interpolation support amount (corresponding to the target deceleration) associated with the interpolation deceleration support control (step S201).

The step S201 will be explained with reference to FIG. 7. In FIG. 7, a time point $t_5$, a time point $t_6$, a time point $t_7$, and a time point $t_8$ are respectively the "support start timing of the first deceleration support control", the "support end timing of the first deceleration support control", the "support start timing of the second deceleration support control", and the "support end timing of the second deceleration support control", which are calculated in the step S104. The difference corresponds to a difference between the time point $t_6$ and the time point $t_7$.

Figure 7:
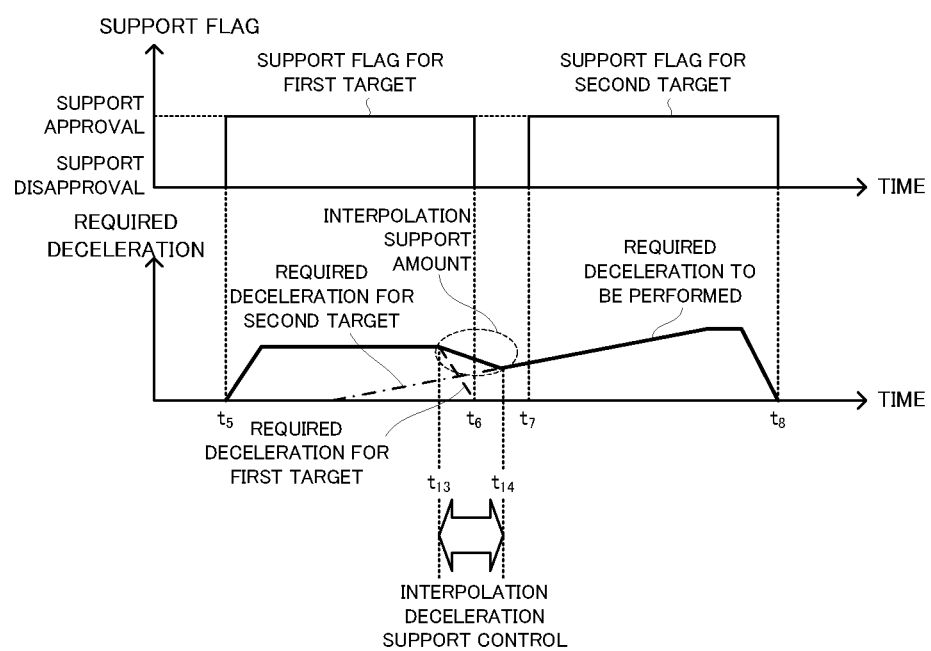
FIG. 7 is a timing chart illustrating an example of the deceleration support control according to the second embodiment.

The support amount calculator 13, which is requested by the support arbitrator 14 to calculate the interpolation support amount in the step S201, calculates the interpolation support amount (refer to a solid line part surrounded by a dashed circle in FIG. 7) on the basis of a changing gradient of the falling of the target deceleration for the first target (refer to a dashed line between a time point $t_{13}$ and the time point $t_6$ in FIG. 7, indicating the "required deceleration for the first target"), wherein the interpolation support amount decreases more mildly than the changing gradient. The support arbitrator 14 outputs the interpolation support amount to the vehicle controller 15 (after the time point $t_{13}$ in FIG. 7).

In the example illustrated in FIG. 7, in the step S201, the support arbitrator 14 further requests the support amount controller 13 to calculate the target deceleration for the second target. In response to the request, the support amount controller 13 calculates the target deceleration for the second target (refer to the "required deceleration for the second target" indicated by an alternate long and short dash line in FIG. 7).

The support arbitrator 14 changes the support target from the first target to the second target, for example, in a timing in which the interpolation support amount becomes equal to the target deceleration for the second target, which is a time point $t_{14}$ in FIG. 7. In other words, the support arbitrator 14 outputs the target deceleration for the second target to the vehicle controller 15 instead of the interpolation support amount, for example, in the timing in which the interpolation support amount becomes equal to the target deceleration for the second target. Thus, in the example illustrated in FIG. 7, the interpolation deceleration support control is performed in a period between the time point $t_{13}$ and the time point $t_{14}$.

In the second embodiment, the interpolation support amount is obtained on the basis of the target deceleration for the first target, and it can be thus interpreted that the interpolation deceleration support control can be realized by continuing the first deceleration support control beyond the support end timing calculated in the step S104. In the step S201, a support flag associated with the interpolation deceleration support control may be set, which is different from the support flag for the first target and the support flag for the second target.

In the example illustrated in FIG. 7, the interpolation support amount is calculated by the support amount calculator 13 on the basis of the changing gradient of the falling of the target deceleration for the first target; however, the interpolation support amount may be also calculated on the basis of the changing gradient of the rising of the target deceleration for the second target in addition to or instead of the changing gradient of the falling of the first target, wherein the interpolation support amount increases more mildly than the changing gradient of the rising of the target deceleration for the second target.

Modified Example

The aforementioned interpolation deceleration support control may be the third deceleration support control, which is independent of the first deceleration support control and the second deceleration support control. In an interpolation deceleration support control according to a modified example, the support target may not be set. The interpolation deceleration support control according to the modified example will be specifically explained with reference to FIG. 8 and FIG. 9.

Figure 8:
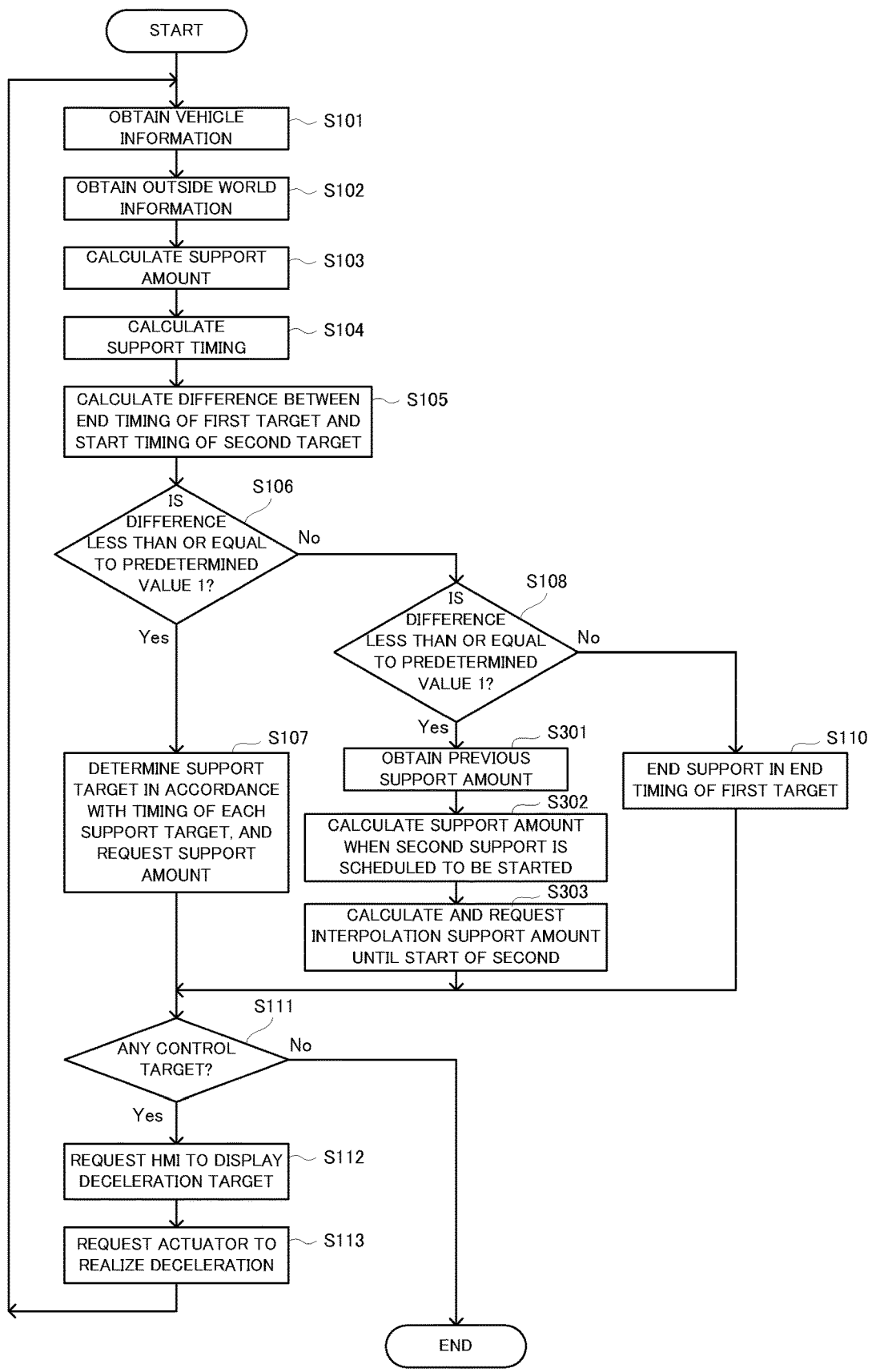
FIG. 8 is a flowchart illustrating a deceleration support process according to a modified example of the second embodiment.

In the step S108 in FIG. 8, if it is determined that the difference, i.e., the difference between the support end timing of the first deceleration support control and the support start timing of the second deceleration support control, is less than or equal to the predetermined value 2 (the step S108: Yes), the support arbitrator 14 obtains a previous support amount (step S301). Here, the "previous support amount" will be explained. The support amount calculator 13 repeatedly calculates the support amount, i.e., at least one of the target deceleration and the interpolation support amount, in a predetermined period on the basis of the vehicle information and the outside world information, which change in real time. The "previous support amount" means the support amount calculated by the support amount calculator 13 in the previous period.

The support arbitrator 14 calculates (or estimates) the support amount associated with the second deceleration support control (hereinafter referred to as an "estimated support amount" as occasion demands) in the support start timing of the second deceleration support control, which is the time point $t_7$ in FIG. 9, on the basis of the previous support amount, the vehicle information and the outside world information (step S302).

The support arbitrator 14 then requests the support amount calculator 13 to calculate the interpolation support amount that allows convergence on the estimated support amount in the support start timing of the second deceleration support control (in other words, the interpolation support amount that allows a smooth change from the previous support amount to the estimated support amount) on the basis of the previous support amount and the estimated support amount (step S303).

Figure 9:
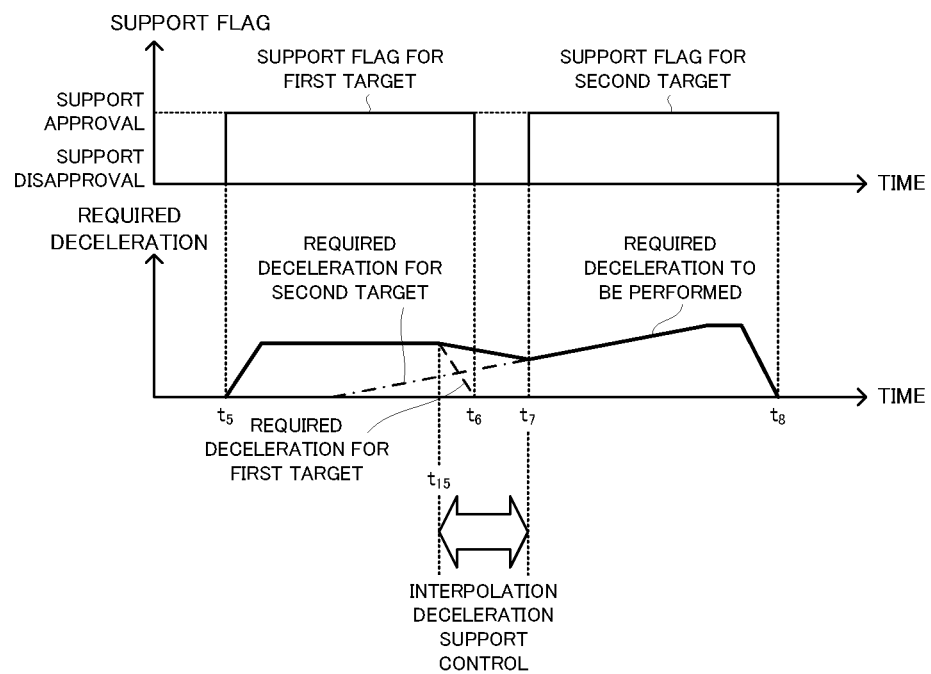
FIG. 9 is a timing chart illustrating an example of a deceleration support control according to the modified example of the second embodiment.

In an example illustrated in FIG. 9, the support arbitrator 14 outputs the interpolation support amount to the vehicle controller 15 from a time point $t_{15}$ to the time point $t_7$, i.e., to the support start timing of the second deceleration support control calculated in the step S104. The support arbitrator 14 outputs the target deceleration for the second target to the vehicle controller 15 instead of the interpolation support amount at the time point $t_7$. Thus in the example illustrated in FIG. 9, the interpolation deceleration support control is performed in a period between the time point $t_{15}$ and the time point $t_7$.

Various aspects of embodiments of the present disclosure derived from the embodiments and modified examples explained above will be explained hereinafter.

A vehicle control apparatus according to an aspect of embodiments of the present disclosure is a vehicle control apparatus configured to perform a deceleration support control of automatically decelerating a host vehicle on condition that there is a deceleration target, which requires decelerating the host vehicle, ahead in a traveling direction of the host vehicle, the vehicle control apparatus provided with: an acquirer configured to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a controller programmed or configured to perform an interpolation deceleration support control of interpolating the first deceleration support control and the second deceleration support control, in a predetermined period including at least a part of an interval between the expected end timing and the predicted start timing, if the interval is less than a first time.

In the aforementioned embodiments, the "support arbitrator 14" corresponds to an example of the "acquirer", and the "vehicle controller 15" corresponds to an example of the "controller". The "support end timing of the first deceleration support control" and the "support start timing of the second deceleration support control" in the aforementioned embodiments respectively correspond to the "expected end timing of the first deceleration support control" and the "expected start timing of the second deceleration support control". The "predetermined value 2" in the aforementioned embodiments corresponds to an example of the "first time".

The "first time" may be a value for determining whether or not to perform the interpolation deceleration support control, and may be set as a fixed value in advance, or as a variable value corresponding to some physical quantity or parameter. The "first time" may be set as a time long enough for a driver of the host vehicle to perceive the poor brake feel, which is caused by the end of the first deceleration support control and the start of the subsequent second deceleration support control, and as a time that allows the driver to feel as if the first deceleration support control and the second deceleration support control were a series of deceleration support control.

If the interval between the first deceleration support control and the second deceleration support control is less than the first time and if no measures are taken, the driver of the host vehicle possibly feels as if the deceleration support control were interrupted due to the poor brake feel. On the vehicle control apparatus, however, if the interval is less than the first time, the interpolation deceleration support control is performed. As a result, the interpolation deceleration occurs due to the interpolation deceleration support control in the predetermined period including at least a part of the interval. Therefore, according to the vehicle control apparatus, it is possible to prevent the poor brake feel from occurring, and to prevent the driver from feeling uncomfortable.

In an aspect of the vehicle control apparatus, the controller is programmed or configured to perform, as the interpolation deceleration support control, at least one of continuing the first deceleration support control beyond the expected end timing and starting the second deceleration support control before the expected start timing. According to this aspect, it is possible to realize the interpolation deceleration support control, relatively easily.

In this aspect, the controller may be programmed or configured to determine a controlled variable associated with the interpolation deceleration support control such that a controlled variable changing gradient is less than a controlled variable changing gradient associated with at least one of the first deceleration support control and the second deceleration support control that are performed if the interval is greater than the first time. By virtue of such a configuration, it is possible to make a relatively mild change in the deceleration between the first deceleration support control and the second deceleration support control. For example, it is possible to improve drivability.

Alternatively, in another aspect of the vehicle control apparatus, the controller is programmed or configured to perform the interpolation deceleration support control as a different control that is different from the first deceleration support control and the second deceleration support control. According to this aspect, it is possible to realize the interpolation deceleration support control that can more appropriately interpolate the first deceleration support control and the second deceleration support control.

A vehicle control apparatus according to another aspect of embodiments of the present disclosure is a vehicle control apparatus configured to perform a deceleration support control of automatically decelerating a host vehicle on condition that there is a deceleration target, which requires decelerating the host vehicle, ahead in a traveling direction of the host vehicle, the vehicle control apparatus provided with: an acquirer configured to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a controller programmed or configured to perform at least one of continuing the first deceleration support control beyond the expected end timing and starting the second deceleration support control before the expected start timing, if an interval between the expected end timing and the expected start timing is less than a second time.

In the aforementioned embodiments, the "support arbitrator 14" corresponds to an example of the "acquirer", and the "vehicle controller 15" corresponds to an example of the "controller". The "support end timing of the first deceleration support control" and the "support start timing of the second deceleration support control" in the aforementioned embodiments respectively correspond to the "expected end timing of the first deceleration support control" and the "expected start timing of the second deceleration support control". The "predetermined value 2" in the aforementioned embodiments corresponds to an example of the "second time".

The "second time" may be a value for determining whether or not to perform at least one of continuing the first deceleration support control beyond the expected end timing and starting the second deceleration support control before the expected start timing, and may be set as a fixed value in advance, or as a variable value corresponding to some physical quantity or parameter. As in the "first time" described above, the "second time" may be set as a time long enough for the driver of the host vehicle to perceive the poor brake feel, and as a time that allows the driver to feel as if the first deceleration support control and the second deceleration support control were a series of deceleration support control.

On the vehicle control apparatus, at least one of continuing the first deceleration support control beyond the expected end timing and starting the second deceleration support control before the expected start timing is performed if the interval between the first deceleration support control and the second deceleration support control is less than the second time. As a result, the interval is reduced or eliminated, and it is thus possible to prevent the poor brake feel from occurring, and to prevent the driver from feeling uncomfortable.

A vehicle control apparatus according to another aspect of embodiments of the present disclosure is a vehicle control apparatus configured to perform a deceleration support control of automatically decelerating a host vehicle on condition that there is a deceleration target, which requires decelerating the host vehicle, ahead in a traveling direction of the host vehicle, the vehicle control apparatus provided with: an acquirer configured to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a controller programmed or configured (i) to perform an interpolation deceleration support control of interpolating the first deceleration support control and the second deceleration support control, in a predetermined period including at least a part of an interval between the expected end timing and the predicted start timing, or (ii) to perform at least one of continuing the first deceleration support control beyond the expected end timing and starting the second deceleration support control before the expected start timing if the interval is less than a first time.

In the aforementioned embodiments, the "support arbitrator 14" corresponds to an example of the "acquirer", and the "vehicle controller 15" corresponds to an example of the "controller". The "support end timing of the first deceleration support control" and the "support start timing of the second deceleration support control" in the aforementioned embodiments respectively correspond to the "expected end timing of the first deceleration support control" and the "expected start timing of the second deceleration support control". The "predetermined value 2" in the aforementioned embodiments corresponds to an example of the "first time".

On the vehicle control apparatus, the interpolation deceleration support control is performed if the interval between the first deceleration support control and the second deceleration support control is less than the first time. As a result, the deceleration occurs due to the interpolation deceleration support control in the predetermined period including at least a part of the interval. Alternatively, on the vehicle control apparatus, at least one of continuing the first deceleration support control beyond the expected end timing and starting the second deceleration support control before the expected start timing is performed if the interval is less than the first time. As a result, the interval is reduced or eliminated. According to the vehicle control apparatus, it is possible to prevent the poor brake feel from occurring, and to prevent the driver from feeling uncomfortable.

The present disclosure can be applied not only to a vehicle operated by a driver, but also to an automatic drive vehicle.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A vehicle control apparatus configured to perform a deceleration support control of automatically decelerating a host vehicle on condition that there is a deceleration target, which requires decelerating the host vehicle, ahead in a traveling direction of the host vehicle, said vehicle control apparatus comprising:
a support arbitrator programmed to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and
a vehicle controller programmed to: receive the expected end timing and the expected start timing from the support arbitrator, and control the host vehicle to decelerate based on an interpolation deceleration support control of interpolating the first deceleration support control and the second deceleration support control, in a predetermined period including at least a part of an interval between the expected end timing and the expected start timing, if the interval is less than a first time.

2. The vehicle control apparatus according to claim 1, wherein said controller is programmed to perform, as the interpolation deceleration support control, at least one of continuing the first deceleration support control beyond the expected end timing and starting the second deceleration support control before the expected start timing.

3. The vehicle control apparatus according to claim 2, wherein said controller is programmed to determine a controlled variable associated with the interpolation deceleration support control such that a controlled variable changing gradient is less than a controlled variable changing gradient associated with at least one of the first deceleration support control and the second deceleration support control that are performed if the interval is greater than the first time.

4. The vehicle control apparatus according to claim 1, wherein said controller is programmed to perform the interpolation deceleration support control as a different control that is different from the first deceleration support control and the second deceleration support control.

5. A vehicle control apparatus configured to perform a deceleration support control of automatically decelerating a host vehicle on condition that there is a deceleration target, which requires decelerating the host vehicle, ahead in a traveling direction of the host vehicle, said vehicle control apparatus comprising:

configured support arbitrator programmed to obtain an expected end timing of a first deceleration support control, which is the deceleration support control for a first target, and an expected start timing of a second deceleration support control, which is the deceleration support control for a second target, if there is the first target as the deceleration target ahead of the host vehicle in the traveling direction and if there is the second target as the deceleration target ahead of the first target; and a vehicle controller programmed to: receive the expected end timing and the expected start timing from the support arbitrator, and control the host vehicle to decelerate based on at least one of continuing the first deceleration support control beyond the expected end timing and starting the second deceleration support control before the expected start timing, if an interval between the expected end timing and the expected start timing is less than a second time.

* * * * *